United States Patent
Lee et al.

(10) Patent No.: US 9,876,654 B2
(45) Date of Patent: Jan. 23, 2018

(54) MESSAGING SERVICE SYSTEM AND METHOD FOR EXPANDING MEMBER ADDITION OPERATION

(75) Inventors: Haejin Lee, Seongnam-si (KR);
JungHo Shin, Seongnam-si (KR);
Seong Hoon Kim, Seongnam-si (KR);
Jungmin Lee, Seongnam-si (KR); Bo Yoon Choi, Seongnam-si (KR);
Youngsu Ko, Seongnam-si (KR)

(73) Assignee: LINE CORPORATION, Tokyo (JP)

( * ) Notice: Subject to any disclaimer, the term of this patent is extended or adjusted under 35 U.S.C. 154(b) by 482 days.

(21) Appl. No.: 13/487,326

(22) Filed: Jun. 4, 2012

(65) Prior Publication Data
US 2012/0311052 A1  Dec. 6, 2012

(30) Foreign Application Priority Data
Jun. 3, 2011 (KR) .......................... 10-2011-0053991

(51) Int. Cl.
*G06F 15/16* (2006.01)
*H04L 12/64* (2006.01)

(52) U.S. Cl.
CPC .............................. *H04L 12/6418* (2013.01)

(58) Field of Classification Search
CPC ..... H04L 12/585; H04L 12/58; H04L 12/581; H04L 12/5855; H04L 12/6418; G06Q 10/107; G06F 15/16
USPC .......................... 709/206, 203, 223, 217, 200
See application file for complete search history.

(56) References Cited

U.S. PATENT DOCUMENTS

| 7,680,770 B1* | 3/2010 | Buyukkokten | ........ G06Q 10/10 340/573.1 |
| 2001/0027527 A1* | 10/2001 | Khidekel et al. | ............. 713/201 |
| 2003/0083086 A1* | 5/2003 | Toyryla | .................. H04W 4/08 455/518 |

(Continued)

FOREIGN PATENT DOCUMENTS

| JP | 2001-168901 | 6/2001 |
| JP | 2003-150528 | 5/2003 |

(Continued)

OTHER PUBLICATIONS

Shuichi Nagata and Michiaki Yasumura, Enzin: A Communication Tool with Instant Access Control, Mar. 2007, pp. 1134-1143, vol. 48, No. 3, IPSJ Journal, Japan.

(Continued)

*Primary Examiner* — El Hadji Sall
(74) *Attorney, Agent, or Firm* — IPUSA, PLLC

(57) ABSTRACT

Provided is a messaging service system and method for adding a contact through a grouping operation. The messaging service system includes a member registering unit configured to create a group, and to register a first member designated by a user as a first participant of the group; and a member managing unit configured to disclose the group to the first participant of the group, to assign, to the first participant, a permission to add a second participant to the group, in which, the member registering unit is configured to add a second member designated by the first participant of the group as the second participant of the group, and the member managing unit is configured to display a list of members registered by the member registering unit and a list of groups created by the member registering unit.

43 Claims, 17 Drawing Sheets

(56) References Cited

U.S. PATENT DOCUMENTS

| | | |
|---|---|---|
| 2006/0015560 A1 | 1/2006 | MacAuley et al. |
| 2006/0025220 A1 | 2/2006 | Macauley et al. |
| 2006/0031510 A1* | 2/2006 | Beck et al. .................... 709/226 |
| 2006/0218225 A1* | 9/2006 | Hee Voon ............. G06Q 30/02 709/201 |
| 2006/0265383 A1* | 11/2006 | Pezaris et al. .................. 707/10 |
| 2007/0067271 A1* | 3/2007 | Lu ..................................... 707/3 |
| 2007/0233736 A1* | 10/2007 | Xiong ................... G06Q 30/02 |
| 2007/0282621 A1* | 12/2007 | Altman ................. G06Q 10/10 705/319 |
| 2008/0040437 A1* | 2/2008 | Agarwal et al. .............. 709/206 |
| 2008/0040442 A1* | 2/2008 | Fieldman ............. G06Q 10/10 709/207 |
| 2008/0046478 A1* | 2/2008 | Mandre .................. G06Q 10/00 |
| 2008/0052348 A1* | 2/2008 | Adler et al. .................... 709/203 |
| 2008/0066080 A1* | 3/2008 | Campbell ........... G06F 17/3089 719/314 |
| 2008/0070593 A1* | 3/2008 | Altman ................. H04L 63/102 455/457 |
| 2008/0133708 A1* | 6/2008 | Alvarado et al. ............. 709/218 |
| 2008/0189399 A1* | 8/2008 | Quoc et al. .................... 709/223 |
| 2008/0222308 A1* | 9/2008 | Abhyanker ................... 709/245 |
| 2009/0043858 A1* | 2/2009 | Park et al. ..................... 709/206 |
| 2009/0048903 A1* | 2/2009 | Lieberman ............ G06Q 30/02 705/7.33 |
| 2009/0055369 A1* | 2/2009 | Phillips ............. G06F 17/30867 |
| 2009/0070694 A1* | 3/2009 | Ore ........................ H04W 60/00 715/764 |
| 2009/0077464 A1 | 3/2009 | Goldsmith et al. |
| 2009/0157795 A1* | 6/2009 | Black ..................... G06Q 10/10 709/202 |
| 2009/0186700 A1* | 7/2009 | Konkle ............................ 463/42 |
| 2009/0234840 A1 | 9/2009 | Chatani |
| 2010/0057743 A1* | 3/2010 | Pierce ............... G06F 17/30699 707/E17.134 |
| 2010/0120011 A1* | 5/2010 | O'Brien ........................ 434/362 |
| 2010/0325207 A1* | 12/2010 | Churchill et al. ............. 709/204 |
| 2011/0191417 A1* | 8/2011 | Rathod .................. G06Q 30/02 709/204 |
| 2012/0030734 A1* | 2/2012 | Wohlert ................ H04L 63/101 726/4 |
| 2012/0041972 A1* | 2/2012 | Goldberg .......... G06F 17/30867 707/769 |
| 2013/0166555 A1* | 6/2013 | Pfaff ............... H04M 1/274583 707/737 |
| 2013/0179502 A1* | 7/2013 | Faller .................... H04L 65/403 709/204 |
| 2013/0239017 A1* | 9/2013 | Shedletsky, III ....... A63F 13/00 715/753 |

FOREIGN PATENT DOCUMENTS

| | | |
|---|---|---|
| JP | 2005-346705 | 12/2005 |
| JP | 2007-172490 | 7/2007 |
| JP | 2007-287131 | 11/2007 |
| JP | 2008-257512 | 10/2008 |
| JP | 2009-116864 | 5/2009 |
| JP | 2009-157864 | 7/2009 |
| JP | 2009-169914 | 7/2009 |
| JP | 2009-245220 | 10/2009 |
| JP | 2010-511924 | 4/2010 |
| JP | 2010-274477 | 12/2010 |
| KR | 10-2001-0108848 | 12/2001 |
| KR | 10-0804901 | 2/2008 |
| KR | 10-2009-0054081 | 5/2009 |
| KR | 10-0982877 | 9/2010 |

OTHER PUBLICATIONS

Japanese Office Action issued Mar. 5, 2013 for related JP Application No. 2012-121761.
Korean Office Action dated May 14, 2014.
Japanese Office Action dated Jan. 19, 2016.
Yasushi Ando, Introduction to Google Wave Version 1, Nikkei BP Hiroshi Segawa, Published on Aug. 23, 2010, Version 1, p. 51-70, 109-113, ISBN:978-4-8222-8438-1, with partial English translation.
Japanese Office Action dated Apr. 5, 2016.

* cited by examiner

MESSAGING SERVICE SYSTEM AND METHOD FOR EXPANDING MEMBER ADDITION OPERATION

CROSS-REFERENCE TO RELATED APPLICATION

This application claims priority from and the benefit of Korean Patent Application No. 10-2011-0053991, filed on Jun. 3, 2011, which is hereby incorporated by reference for all purposes as if fully set forth herein.

BACKGROUND

Field

The following disclosure relates to a messaging service system and a method for expanding a member addition operation in a messaging service.

Discussion of the Background

A messenger application may refer to a software that enables users to exchange a message and data in real time over a wired or wireless network. A mobile messaging service based on the messenger may support a multilateral chat service and a multilateral voice chat service, and may support transmission of files of various formats including images, video clips, and the like.

In the mobile messaging service, a first user may invite a second user to become a member or friend of the first user in the messaging service using contact information of the second user. The second user may be registered as a friend of the first user if the second user accepts the invitation of the first user.

Conventionally, the mobile messaging service may be limited in who the user may invite to join the messaging service. More specifically, the mobile messaging service may invite an additional user (e.g., a third user) of the messaging service to become registered as the first user's friend based on existing contact information obtained by the first user. Accordingly, the messaging service may be unable to invite additional users to become friends of the first user in the messaging service if their contact information is not known to the first user.

The above information disclosed in this Background section is only for enhancement of understanding of the background of the invention and therefore it may contain information that does not form any part of the prior art nor what the prior art may suggest to a person of ordinary skill in the art.

SUMMARY

Exemplary embodiments of the present invention provide a messaging service system and method for providing a differentiated member managing environment through a grouping operation in a messaging service.

Additional features of the invention will be set forth in the description which follows, and in part will be apparent from the description, or may be learned by practice of the invention.

Exemplary embodiments of the present invention provide a messaging service system including a member registering unit configured to create a group, and to register a first member designated by a user as a first participant of the group; and a member managing unit configured to disclose the group to the first participant of the group, to assign, to the first participant, a permission to add a second participant to the group, in which, the member registering unit is configured to add a second member designated by the first participant of the group as the second participant of the group, and the member managing unit is configured to display a list of members registered by the member registering unit and a list of groups created by the member registering unit.

Exemplary embodiment of the present invention discloses a mobile terminal including an interface configured to access a messaging service system that provides a messaging service; and a display screen configured to display a service screen associated with the messaging service, in which the service screen is configured to receive registration of a group including a first member designated by the user as a first participant of the group; the service screen is configured to display a list of registered members and a list of groups; and the service screen is configured to assign, to the first participant of the group, a permission to add a second member as a second participant of the group.

Exemplary embodiments of the present invention provide a messaging service method using a terminal that uses a processor, the method including creating a group in the messaging service using the terminal; registering a first member using the terminal as a first participant of the group; disclosing the group to the first participant; assigning, to the first participant, a permission to add a second participant to the group, in which adding the second participant comprises adding a second member designated by the first participant as the second participant; and displaying a list of members registered using the terminal and a list of groups created using the terminal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
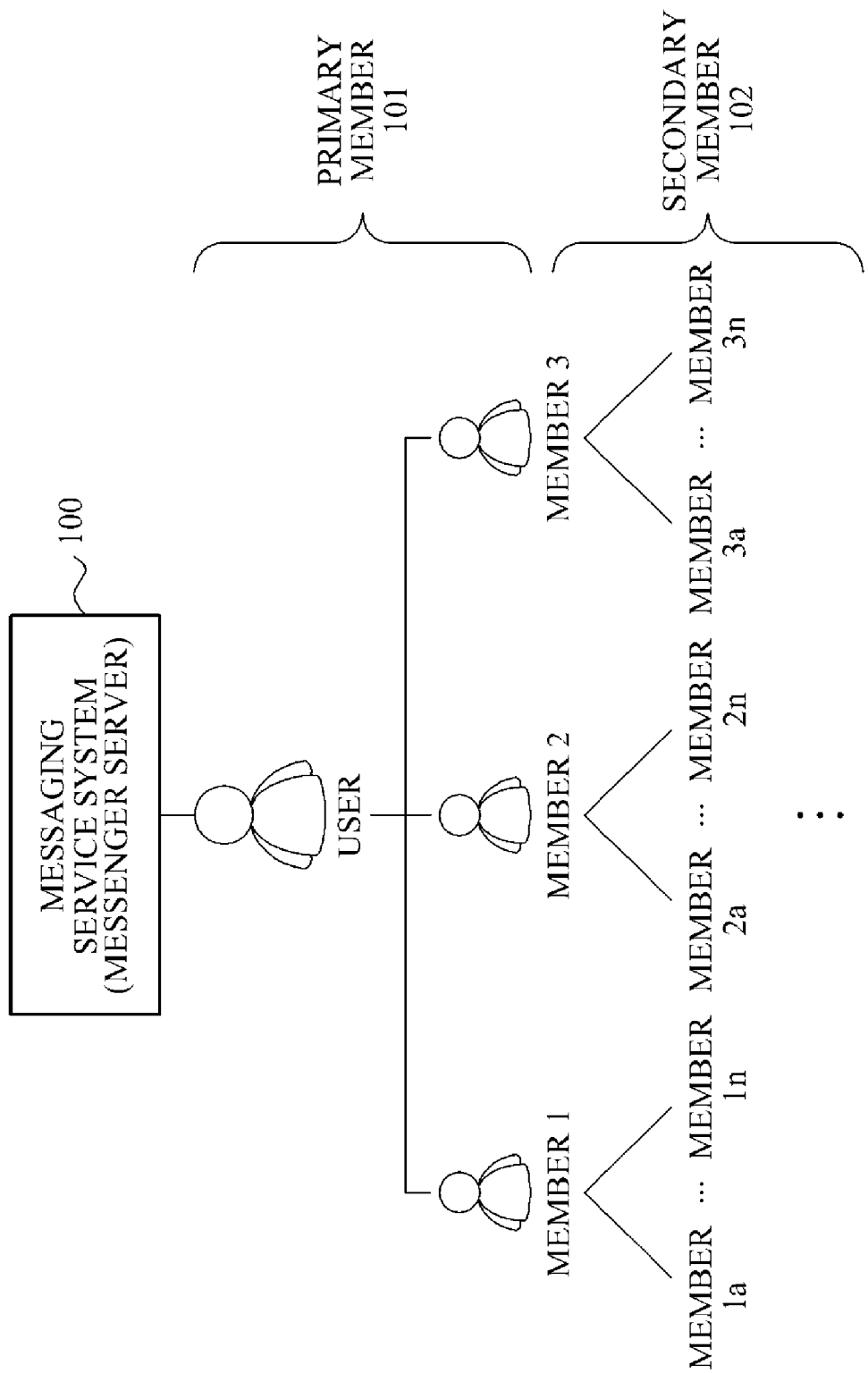
FIG. 1 is a diagram illustrating a general environment of a messaging service system according to an exemplary embodiment of the present invention.

The invention is described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. It will be understood that for the purposes of this disclosure, "at least one of X, Y, and Z" can be construed as X only, Y only, Z only, or any combination of two or more items X, Y, and Z (e.g., XYZ, XZ, XYY, YZ, ZZ). In the drawings, the size and relative sizes of layers and regions may be exaggerated for clarity. Like reference numerals in the drawings denote like elements.

In the present disclosure, a member and a friend may refer to the same entity, which may have a relationship with a user. A participant may refer to a member or an entity registered in a group. These terms are provided only for enhancement of understanding of the provided disclosure and are not meant to be limited to the examples provided herein.

FIG. 1 illustrates an environment of a messaging service system 100 according to an exemplary embodiment of the present invention. FIG. 1 illustrates a messaging service system 100 that expands a member addition operation.

The messaging service system 100 may provide a mobile-based messaging service. A first user may install a service-dedicated application, for example, a smartphone application, a feature phone virtual machine (VM), and the like, so that the first user may exchange a message or data with a member of the messaging service through a messaging service provided by the messaging service system 100.

In the messaging service, the first user may invite a second user of the messaging service that has yet to become registered as a friend of the first user, which may be done through using the second user's contact information stored in a first user's terminal. More specifically, the first user may invite the second user to become friends with the first user by using the second user's contact information, which may be known to the first user. The invited second user may be added and registered as a member or friend associated with the first user if the invited second user accepts the invitation. All or some information registered in a phonebook of a mobile terminal, for example, a phone number, an e-mail address, and the like, may be referred to as contact information.

In addition, the first user may create a group and invite at least one member or friend of the first user, whose contact information is known, to the group. Thus, a group, including the first user and the member who accepts the group invitation of the first user, may be registered as a participant of the group (hereinafter referred to as participant). For example, if the first user registers a group and designates members 1, 2, and 3 to the group, the members 1, 2, and 3 may each be a primary participant 101 of the group. In this example, the group created by the first user may be disclosed to the primary participants 101, and permission to add additional participants to the group may be assigned to the primary participants 101. That is, a primary participant 101 may invite at least one different member, whose contact information may be known, to the group. The member who accepts the invitation of the primary participant 101 may be registered as a secondary participant 102 of the group. The secondary participant 102 may have permission to add additional participants to the group and thus, may add a new member, whose contact information is known, as a tertiary participant (not shown) of the group. As described in the foregoing, the messaging service system 100 may provide a communication tool to register a member based on a group unit, and to enable a participant to add another member to become a participant. Although FIG. 1 distinguishes depths of members of the group for ease of description, it is not limited thereto. Depths may not exist for remaining members excluding the first user, or the depths of the remaining members may have different structures from the depth of the first user.

A terminal (not illustrated) to which a service-dedicated application is installed may be configured as an interface that accesses the messaging service system 100 and displays a service screen associated with a messaging service through interacting with the user. In this example, the terminal may be a type of communication terminal that may be capable of accessing the messaging service system 100. The terminal may include a process to access the messaging service system 100 and a user interface (UI) to utilize a messaging service. The messaging service system 100 may manage processes of a general service that registers and manages a member based on a group. In an example, the terminal may include, without limitation, a mobile terminal, a tablet, a personal digital assistant (PDA), a desktop computer, a laptop computer, and the like. Some of the exemplary embodiments may be described with reference to a mobile terminal, however, it will be understood that it is not limited thereto.

Hereinafter, a service screen of the terminal, which may display a messaging service provided by the messaging service system 100, will be described in detail. An operation or a configuration of a service screen may be different based on an operating system of a terminal, which may include Android®, WinCE®, and the like. Further, an operation or a configuration of a service screen may be different based on a user environment, which may include a world wide web (web) or a wireless application protocol (wap), a service-dedicated application, and the like. Although service screens described in the following are service screens provided through a dedicated application, examples of a service screen may not be limited thereto. A configuration, an operation, or a flow of the service screen may be changed based on circumstances.

An internal configuration of a messaging service system will be described in detail with reference to FIG. 2.

Figure 2:
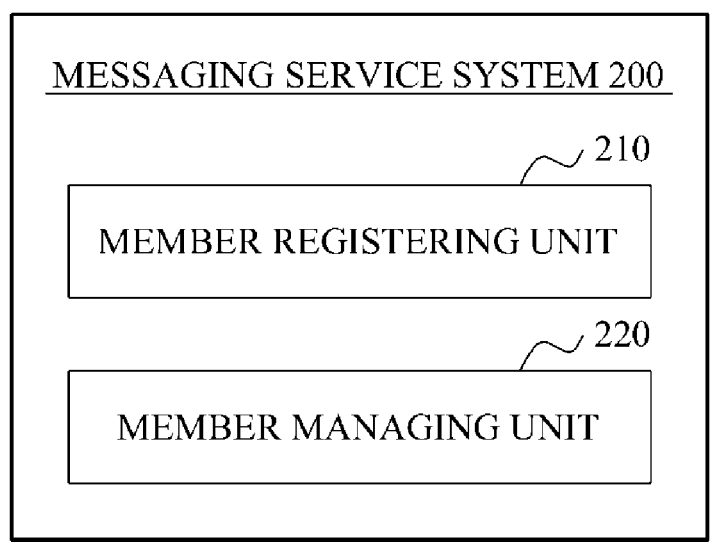
FIG. 2 is a block diagram illustrating an internal configuration of a messaging service system that registers and manages a member based on a group unit according to an exemplary embodiment of the present invention.

FIG. 2 illustrates an internal configuration of a messaging service system 200 that registers and manages a member based on a group unit according to an exemplary embodiment of the present invention. As illustrated in FIG. 2, the messaging service system 200 may include a member registering unit 210 and a member managing unit 220.

The member registering unit 210 may register a member associated with the first user, hereinafter referred to as a friend. In this example, a friend may include other users (e.g., a second user) who may be automatically registered as a friend of the first user using contact information of the other users included in a terminal of the first user or vice-versa, a member added by the first user from among recommended friends, a member registered by the first user by inputting contact information for the member. Further, a second user who has contact information for the first user in a terminal of the second user who invites the first user as a friend may be provided as a recommended friend.

If the first user invites a second user as a member or a friend to be registered by inputting contact information of the second user in a messaging service application, the second user may appear as a recommended friend to the first user. If the first user registers the second user, who may appear as a recommended friend, the second user may become a member or a friend of the first user. The member registering unit 210 may create a group in response to a request from the first user, and may register the first user and one or more friends designated by the first user as participants of the group. The group may be provided as a recommended group to the friends or members of a participant of the group, in a similar manner as the recommended friend. That is, the member registering unit 210 may provide an operation of enabling the first user to select at least one friend to be designated as a participant of the group. The member registering unit 210 may provide an editing operation that removes or adds a designated friend, and an editing operation to remove or correct a registered group. The member registering unit 210 may provide, to the first user, an operation of setting whether to disclose contact information of the first user, and an operation of inputting group information. In this example, the group information may include a name of a desired group, a picture, an icon, and the like. The member registering unit 210 may provide an operation of adding participants of a group included in a recommended group as a friend of the first user. The recommended group may refer to a group that is created by a second user, who is registered as a member. The member registering unit 210 may manage general processes to register a group, and may provide a service screen associated with the processes.

The member managing unit 220 may disclose the group to the friend registered as a participant of the group, and may assign, to the participant, a permission to add additional participants to the group. In this example, a participant of the group may select at least one friend of the participant, and may add the selected friend to the group as a participant of the group. Also, the member managing unit 220 may assign, to the friend registered as a participant of the group, permission to edit group information inputted by the first user, permission to withdraw from the group, and the like. The member managing unit 220 may disclose contact information of the first user to participants of the group if the first user allows disclosure of the contact information. The member managing unit 220 may provide an operation of simultaneously displaying, on the same screen, a list of registered members or friends of the first user, hereinafter referred to as a list of individual friends, and a list of groups registered by the first user, hereinafter referred to as a list of friend groups.

Further, the list of the individual friends may include a second user who is automatically registered as a friend since the first user has contact information of the second user in the terminal of the first user, a third user added as a friend by the first user from among recommended friends, a fourth user registered as a friend by the first user through inputting contact information, and the like. The list of friend groups may include a group created by the first user, a group added by the first user from among recommended groups, and the like. Also, the member managing unit 220 may provide an operation of disclosing contact information of a friend who allows disclosure of contact information.

The member managing unit 220 may provide an operation of a unified search for a keyword, inputted by the first user for a friend search, from the list of individual friends and the list of friend groups. Also, the member managing unit 220 may provide an operation of displaying, on the same screen, a list of members including the users who invited the first user as a friend, hereinafter referred to as a list of recommended friends, and a list of groups in which the first user is invited to be a participant, hereinafter referred to as a list of recommended groups. In this example, if the user registers a member included in the list of recommended friends as a friend, the member may be deleted from the list of recommended friends and may be added to the list of individual friends. In this manner, if the user requests a group included in the list of recommended groups to register the user as a member, the group may be deleted from the list of recommended groups and may be added to the list of friend groups.

The member managing unit 220 may provide an operation of sharing, with a friend, information associated with all participants of the group or a few participants selected by the user. For example, if the first user selects a reference group or a participant of the reference group through an attachment file operation or a similar operation during chatting with a friend, a name or an identity (ID) of the selected group or the participant of the group may be transferred to the friend. In this example, the participant or the group, of which information is transferred to the friend, may automatically be added to the list of individual friends or the list of friend groups. As another example, if the first user selects a reference group or a participant of the reference group from the list of friend groups through use of an attachment file operation during chatting with a friend, contact information of participants of the selected group or the selected participants may be transferred to the friend if the respective participants allow disclosure of their contact information. The contact information of the participant transferred to the friend may be stored in a messaging service system 200 or a terminal of the friend.

Hereinafter, a configuration and an operation of a service screen will be described in detail.

Figure 3:
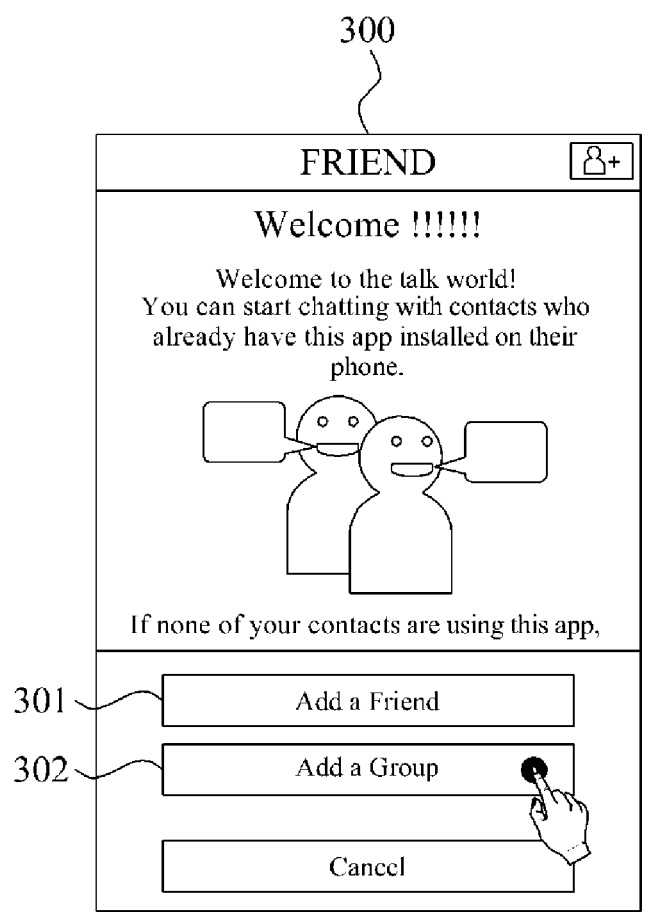
FIG. 3, FIG. 4, and FIG. 5 are diagrams illustrating examples of a service screen that registers a group according to an exemplary embodiment of the present invention.
Figure 4:
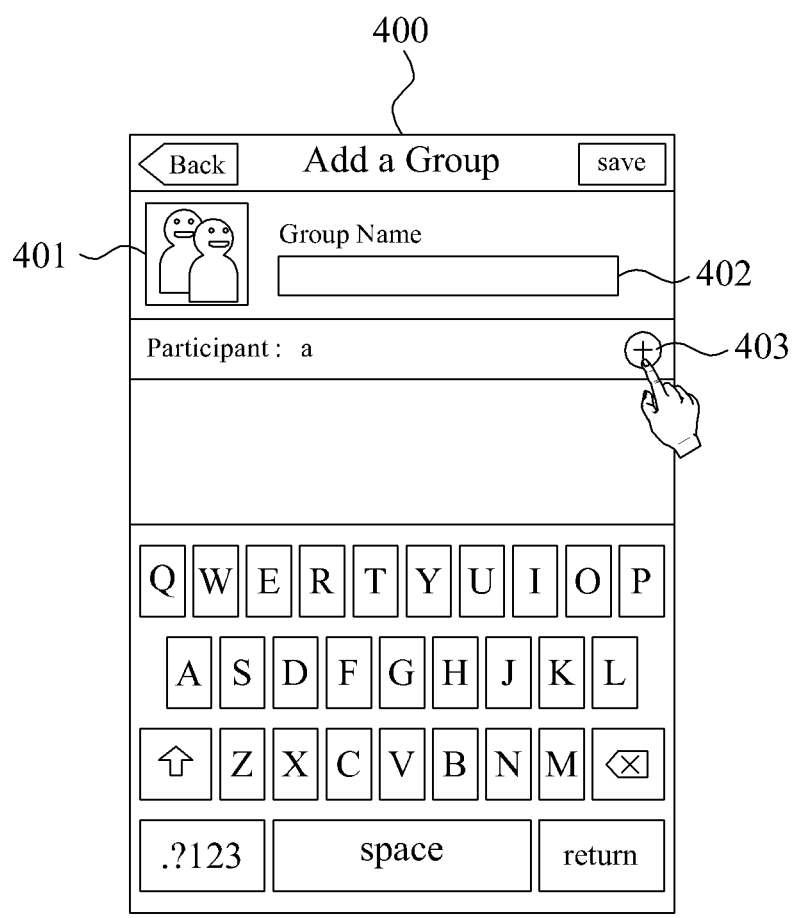
Figure 5:
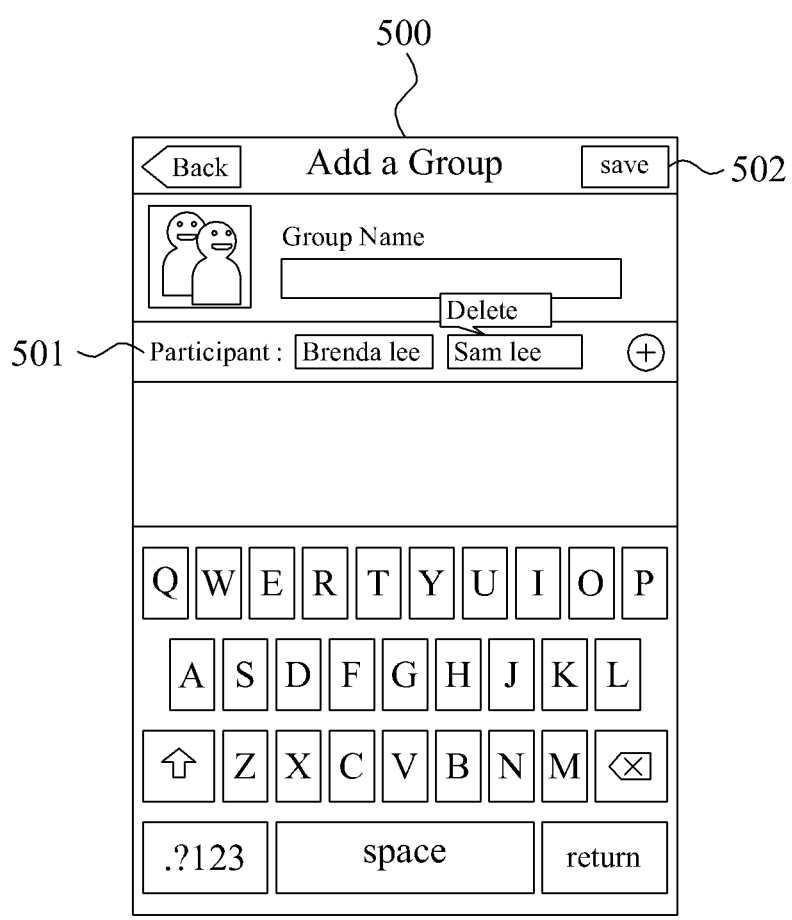

FIG. 3, FIG. 4, and FIG. 5 illustrate examples of a service screen that registers a group according to an exemplary embodiment of the present invention.

As illustrated in FIG. 3, a service screen 300 that provides an operation of adding a friend may include an "Add a Friend" menu 301 and an "Add a Group" menu 302. In this example, the "Add a Friend" menu 301 may lead to a page to add an individual member, and the "Add a Group" menu 302 may lead to a page to create a group and register an individual member to the group as a participant.

If the user touches the "Add a Group" menu 302 on the service screen 300 of FIG. 3, the service screen 300 may be shifted to an "Add a Group" page 400. The "Add a Group" page 400 may include an icon addition menu 401, a name input menu 402, a member addition menu 403, and the like. In this example, the icon addition menu 401 may provide an operation of setting a representative icon or a picture of a group to be created. If the icon addition menu 401 is touched, an action sheet to add a picture may be provided. The icon or the picture added through the icon addition menu 401 may be deleted or edited.

The name input menu 402 may provide an input window to input a name of a group, and an on screen display (OSD) keyboard. The participant addition menu 403 may provide capability of adding and registering a participant of a group. If the name input menu 402 is touched, a list of friends may be shown in a modal format. Also, the participant addition menu 403 may provide an input window to input a text if the corresponding menu is touched, and may support a search using the text inputted through the input window as a keyword. For example, if the text is inputted through use of the participant addition menu 403, a list of right truncation search results including a member name, an e-mail address, and the like may be provided at a bottom of the "Add a Group" page 400. If a member is selected from the list of right truncation search results, a name of the corresponding member may be inputted to a participant addition space.

FIG. 5 illustrates an "Add a Group" page 500 in which two members are added as participants of a group. As illustrated in FIG. 5, names of the members added as participants of the group are aligned or disposed in a participant addition space 501 of the "Add a Group" page 500. In this example, if a name of a member is touched in the participant addition space 501, a color of the name may be changed and a speech bubble configured to include a delete menu may appear. That is, if a user touches a speech bubble appearing by a selected member, the corresponding member may be deleted from the participant addition space 501. If inputting group information, for example, an icon, a picture, a name, and the like, and addition of participants is completed, a save menu button 502 that enables storage of respective information may appear in the "Add a Group" page 500. If the user touches the save menu button 502, the member inputted to the participant addition space 501 may be registered as a participant of the group, and the group created by the user may be stored. Upon storing the group, a service screen that displays a list of individual friends and a list of friend groups may appear, and a popup message may be displayed on a terminal of the member invited to become a participant of the group to inform the member of the invitation from the user. In this example, if the user sets contact information to be disclosed while creating the group, the contact information for the user may be disclosed to some or all participants of the group. The invited member may be classified to be displayed in a pending list, which may be displayed in the list of friend groups, until the invited member accepts the invitation to become a participant. If the member accepts the invitation, the member may be added to a list of participants of the group.

Figure 6:
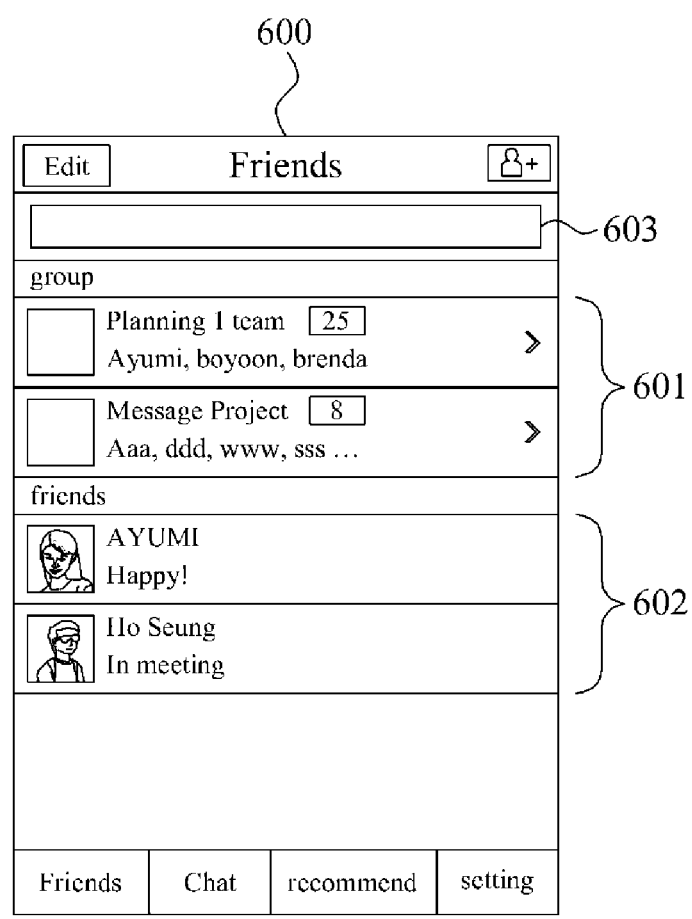
FIG. 6 is a diagram illustrating an example of a service screen that simultaneously displays a list of individual friends and a list of friend groups according to an exemplary embodiment of the present invention.

FIG. 6 illustrates a "Friends" page 600 displaying a list of friends registered by a user. As illustrated in FIG. 6, the "Friends" page 600 simultaneously displays a list of friend groups 601 registered by the user and a list of individual friends 602 registered by the user. In this example, among participants of a group included in the list of friend groups 601, a participant who was invited by the user may be displayed in both the list of friend groups 601 and the list of individual friends 602, and a participant who was invited by another participant (e.g., a primary participant 101 of FIG. 1) may be displayed in the list of friend groups 601 but not in the list of individual friends 602.

The "Friends" page 600 may provide a menu that leads to a page for displaying participants of a group for the list of friend groups 601. Also, the "Friends" page 600 may display a picture icon, a name, a status message, and the like for one or more friends listed in the list of individual friends 602. If a space corresponding to an individual friend is touched, a message screen to provide a chatting operation with the selected friend or a popup layer of the friend may be displayed. The "Friends" page 600 may provide a search bar 603 to search for a friend from the list of friend groups 601 and the list of individual friends 602. In this example, the search bar 603 may provide a unified search operation based on a keyword inputted by the user, from the list of friend groups 601 and the list of individual friends 602.

FIG. 7, FIG. 8, FIG. 9, and FIG. 10 illustrate examples of a service screen that edits a list of individual friends and a list of friend groups according to an exemplary embodiment of the present invention.

Figure 7:
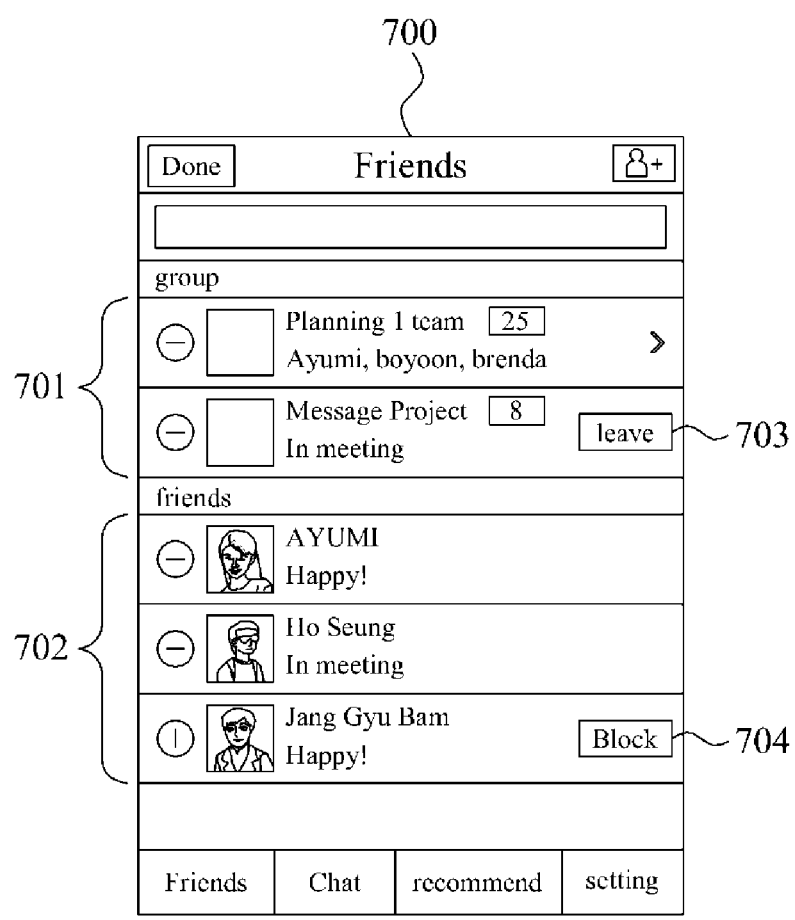
FIG. 7, FIG. 8, FIG. 9, and FIG. 10 are diagrams illustrating examples of a service screen that edits a list of individual friends and a list of friend groups according to an exemplary embodiment of the present invention.

FIG. 7 illustrates a "Friends" editing page 700 where the user edits a list of friend groups 701 and a list of individual friends 702. If the user enters the editing mode while the list of friend groups 701 or the list of individual friends 702 are displayed in an edit mode, various menu buttons for a corresponding list may be displayed on the "Friends" page 700. For example, a leave button 703 may be displayed for the list of friend groups 701. If the user presses the leave button 703, a corresponding group may be deleted from the list of friend groups 701 and the user may be excluded from the group. For the list of individual friends 702, a block button 704 may be displayed. If the user presses the block button 704, a corresponding friend may be removed from the list of individual friends 702 and may be included in a block list that manages blocked friends.

Figure 8:
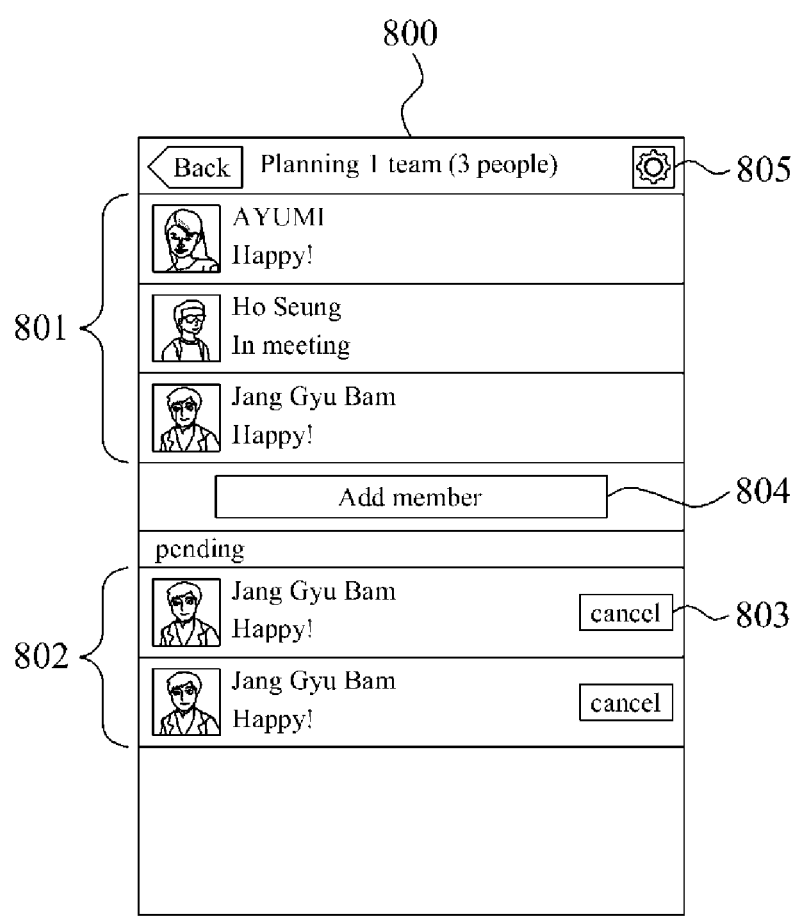

If the user selects a reference group from the list of friend groups 601 of the "Friends" page 600, the service screen may be shifted to a group participant page 800 that displays a list of participants of a corresponding group as illustrated in FIG. 8. Group information associated with a group, for example, a name, a picture, an icon of a group, and the like may be displayed on the group participant page 800. A list 801 of participants who already accepted invitation for a corresponding group, and a pending list 802 including members who has not yet accepted the invitation to become a participant, or pending participants, may be separately displayed on the group participant page 800. In this example, a cancel menu 803 that enables the user to cancel the invitation may be provided for the pending list 802. In this example, if the cancel menu 803 is touched for a reference pending participant, the pending participant may be deleted from the pending list 802 of the group, and may be deleted from a list that recommended the pending participant. Also, an "Add member" menu 804 may be provided on the group participant page 800 so that the user may add another member to become a participant of the group.

Figure 9:
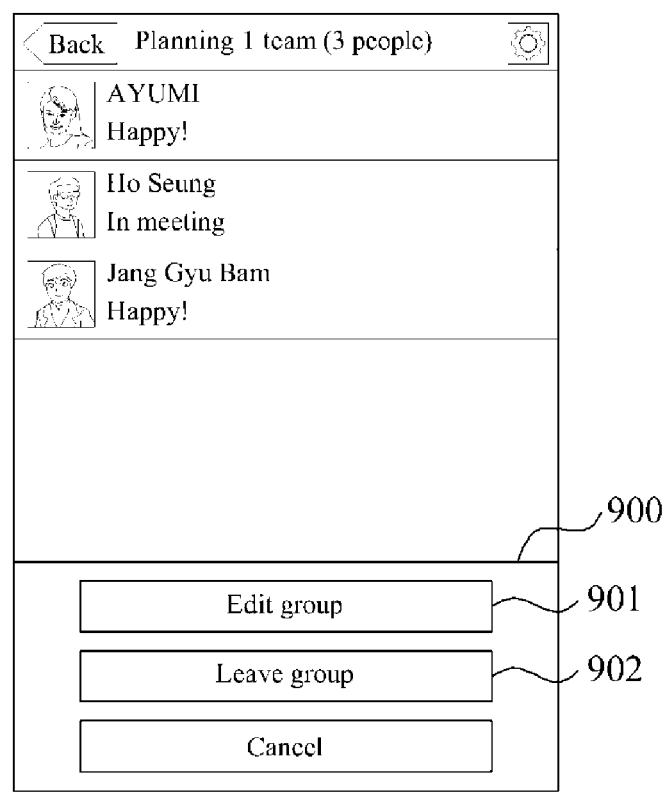

A setting menu button 805 to provide a setting mode for a selected group may be displayed on the group participant page 800. If the settings menu 805 is touched on the group participant page 800, an action sheet 900 including menus associated with the group may be displayed as shown in FIG. 9. The action sheet 900 may include an "Edit group" menu 901 to edit a group, and a "Leave group" menu 902 to delete the respective group from a list of friend groups. If the user touches the "Edit group" menu 901, the service screen may be shifted to an "Edit Group" page 1000 as illustrated in FIG. 10.

Figure 10:
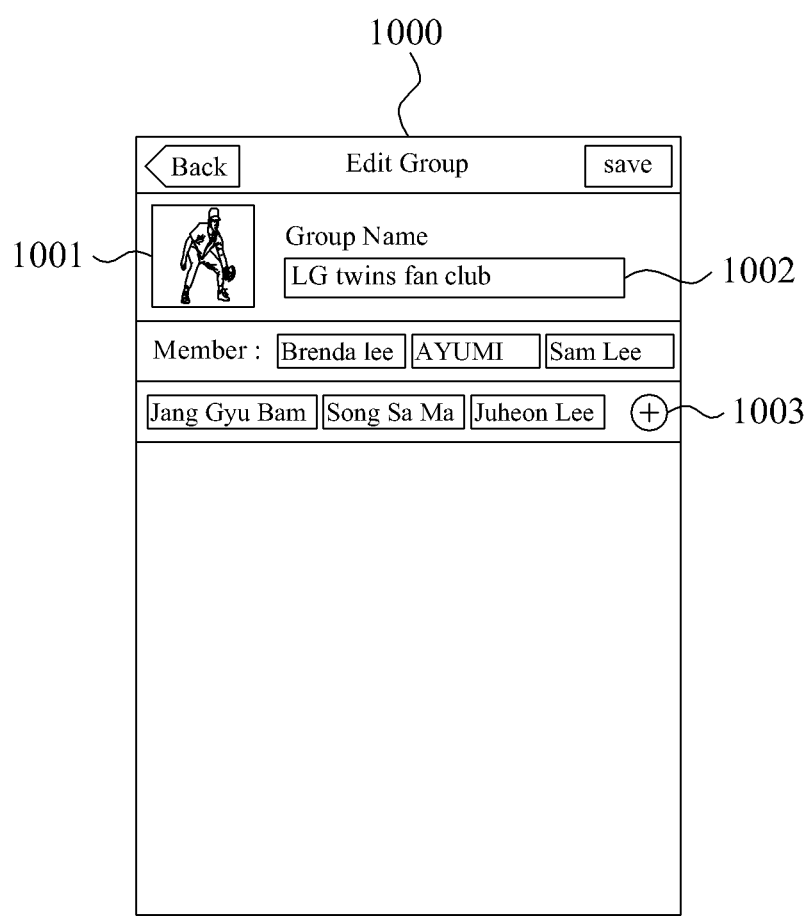

Referring to FIG. 10, the "Edit Group" page 1000 may display an icon edit menu 1001 to edit an icon or a picture of a group, a name edit menu 1002 to edit a name of a group, a participant edit menu 1003 to add, delete, or change a participant of a group, and the like.

Figure 11:
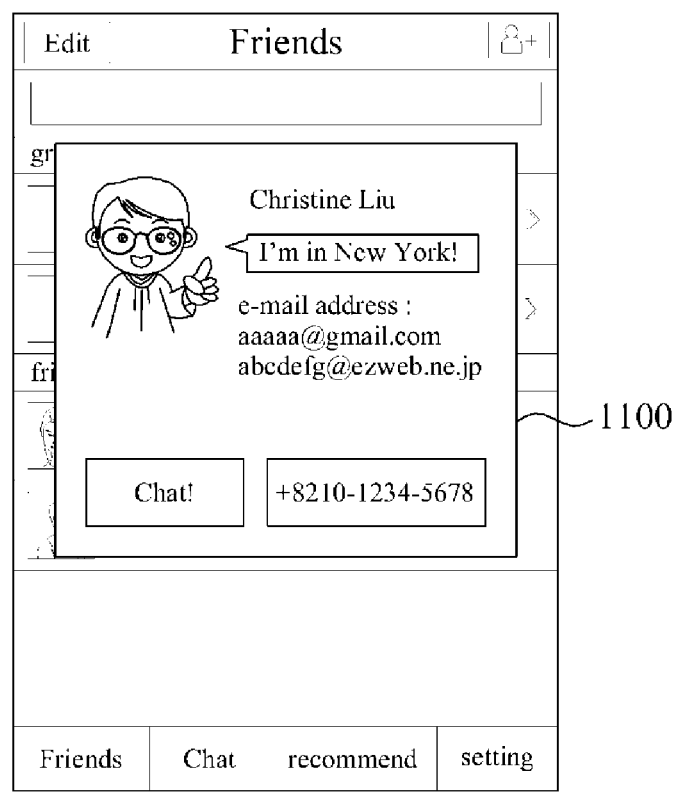
FIG. 11 is a diagram illustrating an example of a service screen that provides a popup layer of a member who allows disclosure of contact information according to an exemplary embodiment of the present invention.

FIG. 11 illustrates an example of a service screen that provides a popup layer 1100 of a member who allows disclosure of contact information according to an exemplary embodiment of the present invention.

If the user touches a thumbnail of a reference participant included in the list of individual friends 602 of the "Friends" page 600 or the list of participants 801 of the group participant page 800, a popup layer 1100 that discloses information of the corresponding participant may be displayed on a service screen. Information included in the popup layer 1100 includes, for example, a thumbnail, a full name, a status message, that is, a message inputted by the corresponding participant, and the like. Also, a chat menu to provide a chat service with the corresponding participant, a call menu to call the corresponding participant, and the like may be displayed. If the user touches the thumbnail on the popup layer 1100, an original image may be displayed as a full screen image. Also, contact information, such as a phone number, an e-mail address, and the like, may be displayed on the popup layer 1100 if the corresponding participant allows disclosure of the contact information.

Figure 12:
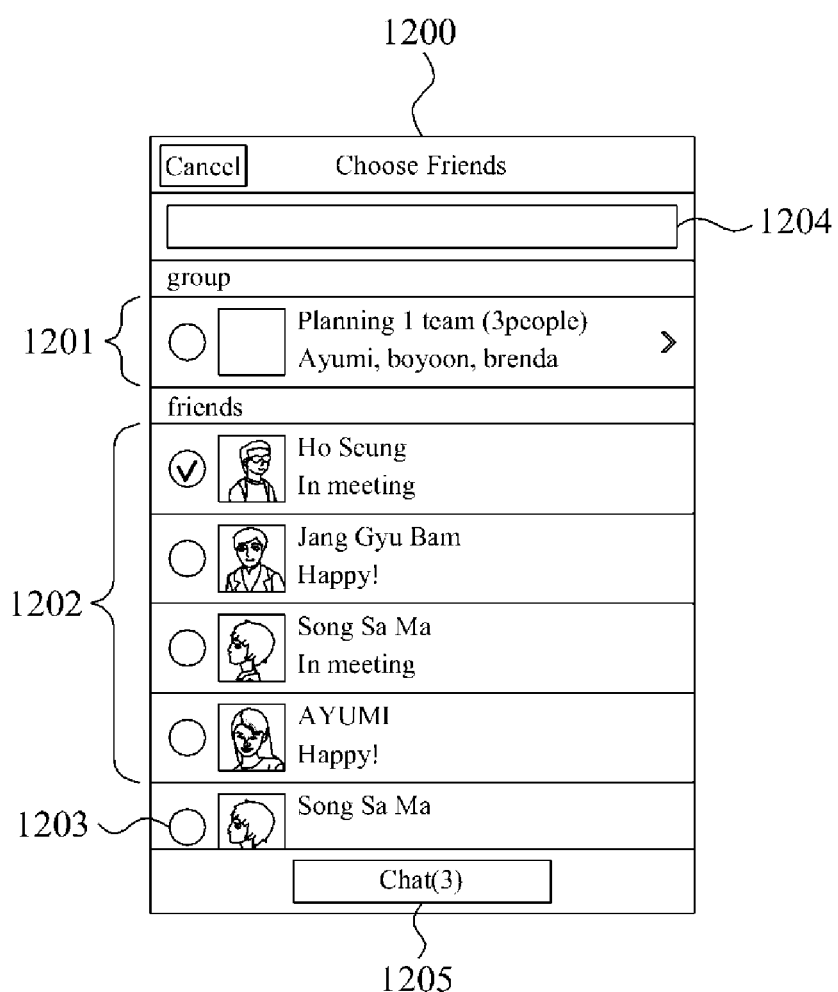
FIG. 12 and FIG. 13 are diagrams illustrating examples of a service screen to enable selection of a participant or a friend from a list of individual friends and a list of friend groups according to an exemplary embodiment of the present invention.
Figure 13:
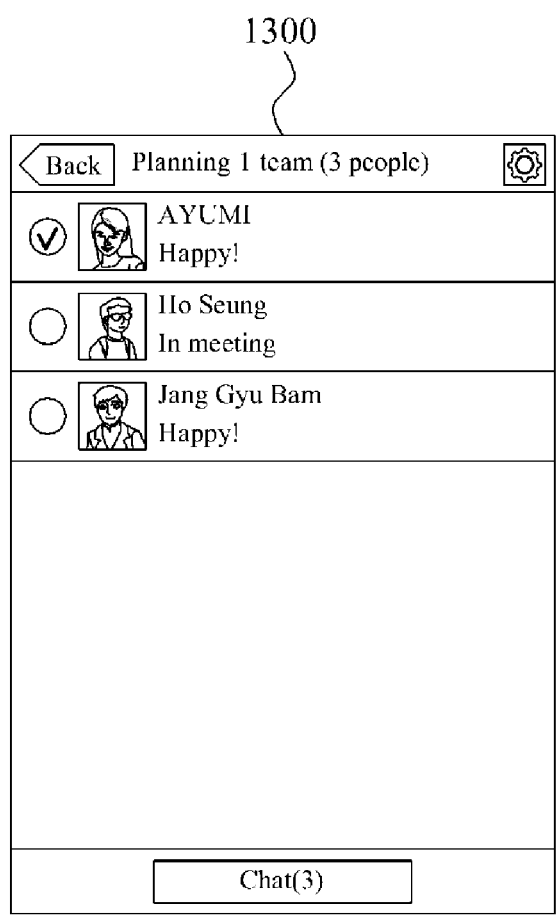

FIG. 12 and FIG. 13 illustrate examples of a service screen that selects a participant or a friend from a list of individual friends or a participant from a list of friend groups to chat with according to an exemplary embodiment of the present invention.

FIG. 12 illustrates a "Choose Friends" page 1200 where the user selects a friend to chat with. The "Choose Friends" page 1200 separately displays a list of friend groups 1201 and a list of individual friends 1202. Also, a selection space 1203, which may allow the user to select or deselect a friend to chat with, may be provided for each friend or friend group. Also, the "Choose Friends" page 1200 may provide a search bar 1204 through which a friend search may be performed from the list of friend groups 1201 and the list of individual friends 1202. The user may select a friend group or a participant by using the search bar 1204. The user may also select a friend group or a participant from the list of friend groups 1201 and the list of individual friends 1202, through use of the selection space 1203. If an area excluding the selection space 1203 or an end of the area is touched on the list of friend groups 1201, the service screen may be shifted to a participant selection page 1300 of FIG. 13. A selected member menu 1205 indicating a number of members selected by the user may be displayed on the "Choose Friends" page 1200. If the user selects a group from the list of friend groups 1201, a number of participants included in the group may be displayed on the selected member menu 1205.

Figure 14:
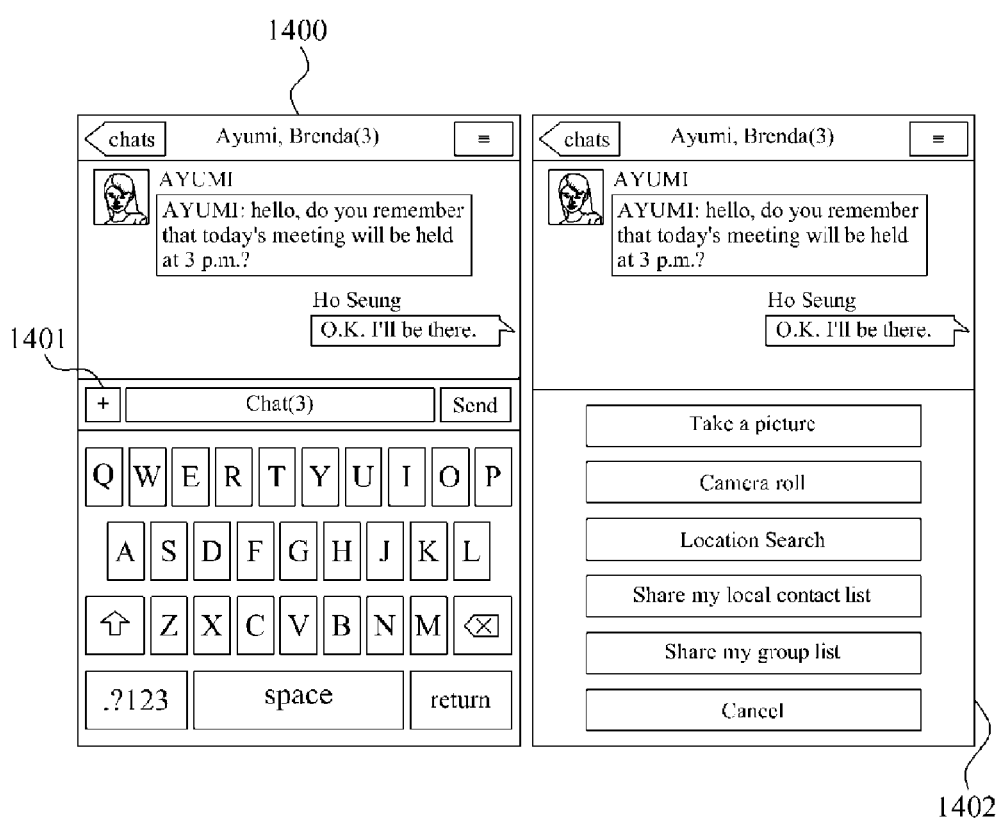
FIG. 14 and FIG. 15 are diagrams illustrating examples of a service screen that shares, with a member chatting with a user, a group and participants of the group according to an exemplary embodiment of the present invention.
Figure 15:
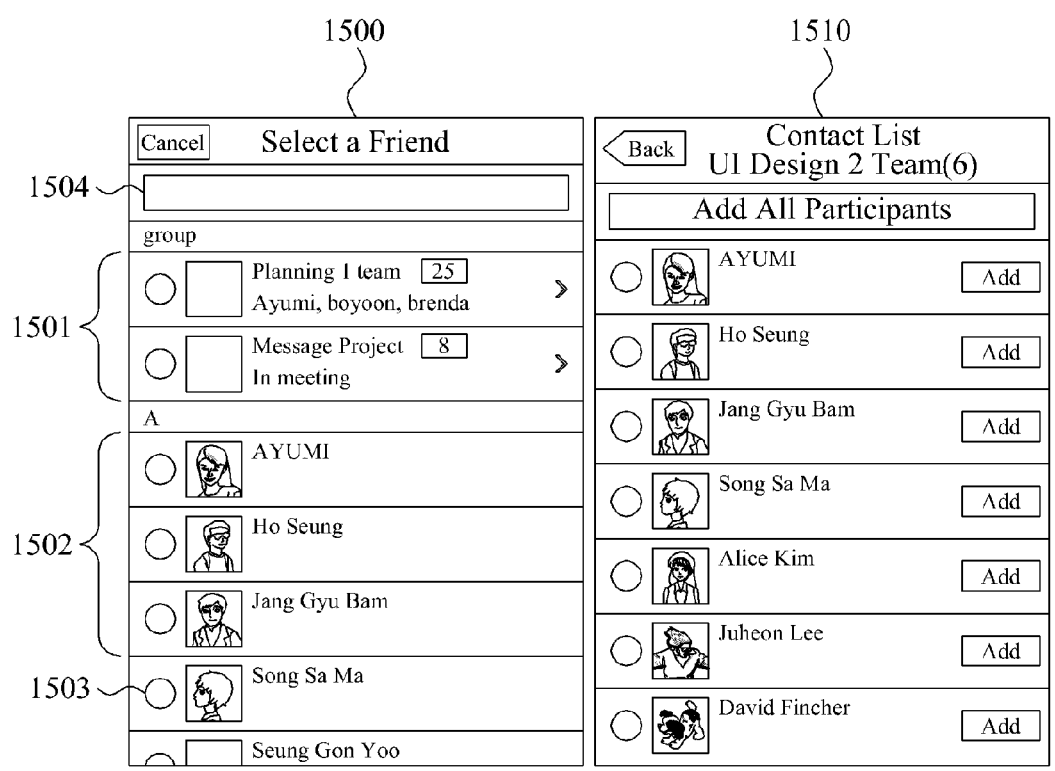

FIG. 14 and FIG. 15 illustrate examples of a service screen that shares, with a member chatting with a user, a group and participants of the group according to an exemplary embodiment of the present invention.

FIG. 14 illustrates a chat page 1400 with a chat window. The chat page 1400 may display messages exchanged with a friend in an order of a recent message to older messages. However, the ordering of the messages is not limited thereto. An attachment file menu 1401 that allows transmission of data to the friend with whom the user chats with may be displayed on the chat page 1400. An action sheet 1402 with various operations that may be selected for execution may appear if the user touches the attachment file menu 1401. More specifically, the action sheet 1402 may include a picture transfer menu to transfer a picture or a video clip captured through a camera or stored in an album or data storage, a voice transfer menu to send a voice message, a location transfer menu to send location information, a contact information transfer menu to send contact information stored in a phonebook, a friend share menu to share a friend included in a list of individual friends or a list of friend groups, and the like. Particularly, the user may share, with a member with whom the user chats with, a friend included in a list of individual friends, or a friend or a group included in a list of friend groups. Also, the user may share, with the member, contact information of a friend if the friend allows disclosure of the contact information. If the user touches a friend share menu on the action sheet 1402, the service screen may be shifted to a "Select a Friend" page 1500 where the user may select a friend or a group from a list of individual friends or a list of friend groups, as illustrated in FIG. 15.

Referring to FIG. 15, the "Select a Friend" page 1500 may display a list of friend groups 1501 and a list of individual friends 1502 separately. Also, a selection space 1503 may be provided for each friend or friend group so that the user may select a friend or a friend group to be shared with the friend or friend group with whom the user is chatting with. Also, the "Select a Friend" page 1500 may provide a search window 1504 through which a friend search may be performed from the list of friend groups 1501 and the list of individual friends 1502. If an area excluding the selection space 1503 or an end of the area is touched on the list of friend groups 1501, the service screen may be shifted to a participant selection page 1510 where the user selects a participant of a corresponding group. On the participant selection page 1510, some or all participants of a corresponding group may be displayed. Also, a selection menu to select a corresponding participant may be displayed for each participant, and an "Add All Participants" menu to select all the participants may be displayed. Accordingly, the user may freely select a group, a target friend in a group, or an individual friend from among a list of individual friends of a messaging service, and may share contact information in addition to a name or an ID of the selected friend through use of the attachment file operation.

Figure 16:
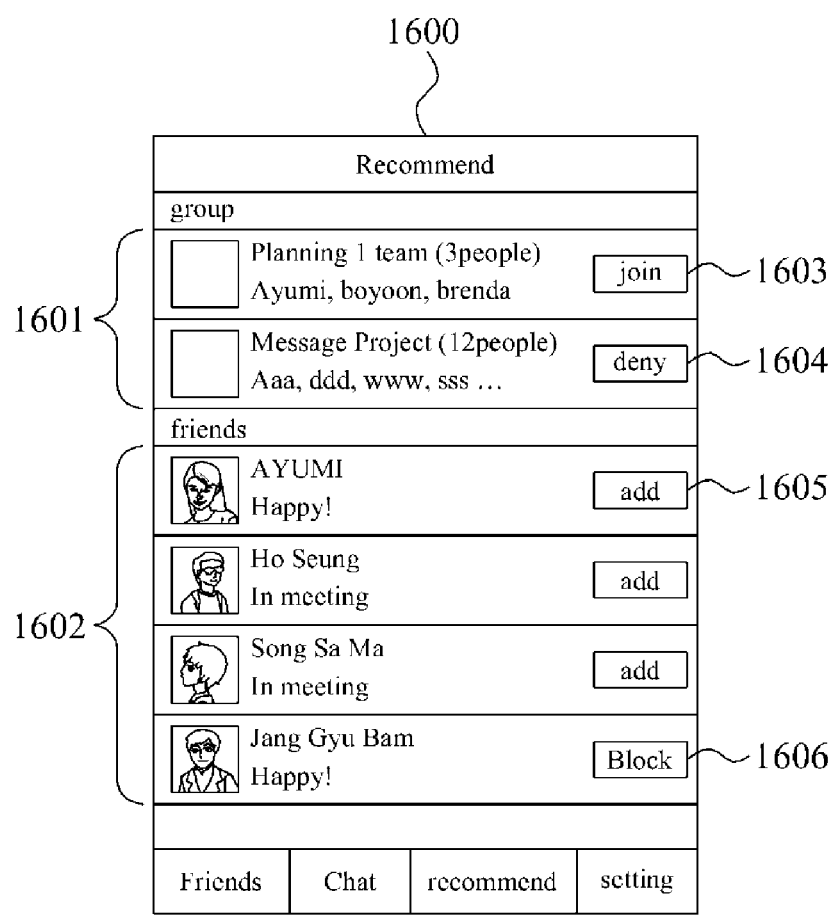
FIG. 16 is a diagram illustrating an example of a service screen that simultaneously displays a list of recommended friends and a list of recommended groups according to an exemplary embodiment of the present invention.

FIG. 16 illustrates a "Recommend" page 1600, which displays a list of pending friends and/or pending friend groups that may have registered the user as a requested friend. A list of recommended groups 1601 corresponding to a list of groups that registered the user as a requested participant and a list of recommended friends 1602 corresponding to a list of friends who registered the user as a requested friend may be simultaneously displayed on the "Recommended" page 1600. The list of recommended groups 1601 may not be displayed on the "Recommend" page 1600 if a group that invites the user is absent of if no group invited the user to become a group member. The "Recommend" page 1600 may provide a join menu button 1603 that enables the user to be registered as a participant of a corresponding group if the join menu button 1603 is pressed. The join button 1603 may be available for each group listed in the list of recommended group 1601. More specifically, if the join menu button 1603 is touched with respect to a selected group, the group may be added to the list of friend groups and may be deleted from the list of recommended groups 1601.

Also, if the user swipes across a group area of the list of recommended groups, a deny menu button 1604 that enables the user to refuse the registration as a participant may appear on the "Recommend" page 1600. In this example, if the user touches the deny menu button 1604, the user refuses an invitation from a group and thus, the group may be deleted from the list of recommended groups 1601. Also, the "Recommend" page 1600 may display an addition menu button 1605 that enables the user to add the selected friend from the list of recommended friends 1602 to the list of individual friends. In the same manner as the deny menu button 1604, a block menu button 1606 to refuse registration as a friend may appear if the user swipes across an individual friend area.

Figure 17:
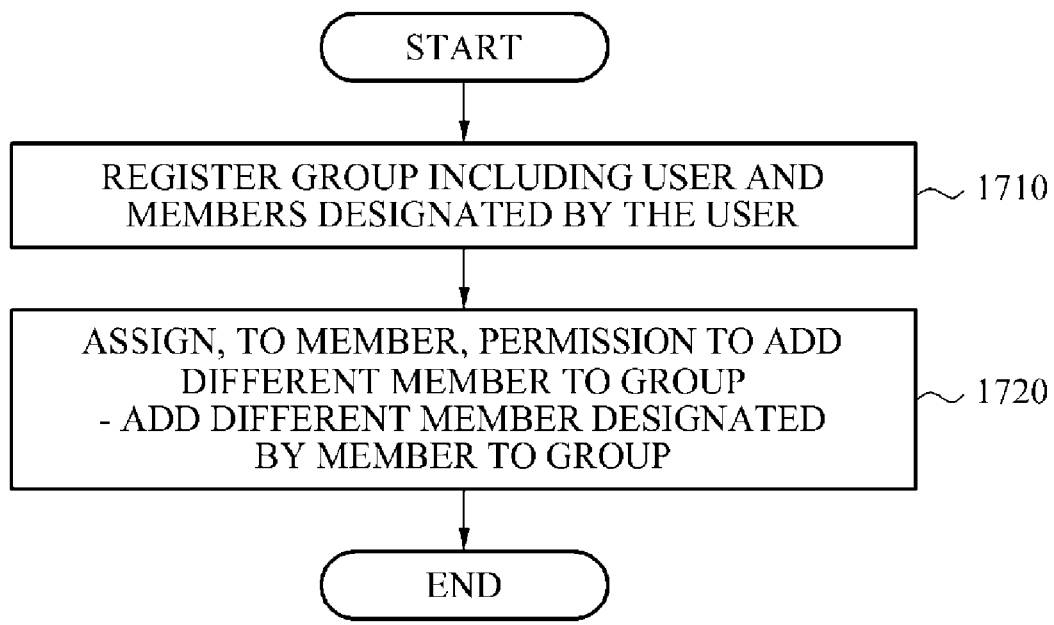
FIG. 17 is a flowchart illustrating a messaging service method that registers and manages a member based on a group unit according to an exemplary embodiment of the present invention.

FIG. 17 illustrates a messaging service method that registers and manages a participant based on a group unit according to an exemplary embodiment of the present invention. The messaging service method is described as being performed by the messaging service system 200 of FIG. 2 but is not limited thereto.

In operation 1710, the messaging service system 200 may create a group in response to a request from a user, and may register the user and one or more friends designated by the user as participants of the group. Further, the messaging service system 200 may provide an operation of enabling the user to select at least one friend to be designated as a participant of the group. Also, the messaging service system 200 may provide an operation enabling the user to set whether to disclose contact information of the user during registering the group. The messaging service system 200 may provide an operation of inputting group information, for example, a name, a picture, an icon, and the like, during registering the group.

In operation 1720, the messaging service system 200 may disclose the group to the friend registered as participants, and may assign, to the friend, a permission to add a participant to the group.

In this example, the friend registered as a participant of the group may select at least one different friend to be added to the group. The messaging service system 200 may assign, to the friend registered as a participant of the group, a permission to edit group information inputted by the user, a permission to withdraw from the group, and the like. The messaging service system 200 may disclose contact information of the user to participants of the group if the user allows disclosure of the contact information. The messaging service system 200 may provide an operation of displaying a list of individual friends registered by the user and a list of friend groups registered by the user. The messaging service system 200 may provide an operation of disclosing contact information of a friend who allows disclosure of contact information from among friends included in the list of friend groups or the list of individual friends. The messaging service system 200 may provide a unified search operation for a keyword, inputted by the user for a friend search, from the list of friend groups and the list of individual friends. Accordingly, the user may search for a specific friend (e.g., Fred Lee) within a list of friend groups and individual friends.

The messaging service system 200 may provide an operation of simultaneously displaying a list of recommended friends who register the user and a list of recommended groups that are created by other friends, which include user as a participant. The messaging service system 200 may provide an operation of sharing, with a friend of the user, all or some participants of the group. For example, if the user selects a reference group or a participant of the reference group from the list of friend groups through an attachment file operation while chatting with a friend, the user may share, with the friend, a name or an ID of the selected group or the selected participant. If the user selects a reference group or a participant of the reference group, from the list of friend groups through an attachment file operation during a chatting session with a friend, the user may share contact information for the participants of the selected group or the selected participant with the friend.

As described in the foregoing, a participant may be registered and managed based on a group unit in a messaging service and thus, a differentiated participant managing service may be provided. In addition, one or more participants included in a group, in addition to the user who creates the group, may have permission to invite additional users to become a participant and thus, a participant addition operation may be expand even if the user does not have contact information of the additional participants. The participants of the group may disclose contact information and may readily exchange phone numbers, an e-mail address, and the like with other participants and thus, an opportunity of exchanging contact information may be provided. In the messaging service, group information may be shared among the participants through use of an attachment file operation and thus, the group information may be shared with a member who is not a participant of the group.

The method according to the above-described exemplary embodiments of the present invention may be recorded in non-transitory computer readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts.

According to exemplary embodiments of the present invention, a member of a messaging service may be registered and managed based on a group unit and thus, a differentiated member managing service may be provided. In addition, a participant in a group, in addition to a user who creates the group, may invite a member to the group to become a participant and thus, an operation of adding a member may be expanded.

According to exemplary embodiments of the present invention, a user or participants of a group may disclose contact information and may readily exchange phone numbers, an e-mail address, and the like with other participants and thus, an opportunity of exchanging contact information may be provided. That is, the user may be connected to another user whose contact information is not known through the group, and may share a name or an identification (ID) in a service, a phone number, an e-mail address, and the like if the participant is in the same group and allows disclosure of the information.

According to exemplary embodiments of the present invention, information associated with a participant is shared among members through use of an attachment file operation or a similar operation and thus, the information may be shared with a member who may not be a participant of a group. Accordingly, a communication tool that enables an increasing number of members to connect to each other through the group may be provided.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A messaging service system, comprising:
a member registering unit configured to allow a user to create a group, and to register a first member designated by the user as a first participant of the group; and
a member managing unit configured to disclose the group to the first participant and assign, to the first participant, a permission to add a second participant to the group,
wherein the member registering unit is configured to add a second member designated by the first participant as the second participant of the group, and the member managing unit is configured to display a list of members registered by the member registering unit and a list of groups created by the member registering unit,
wherein the second participant is displayed in the list of groups displayed by the member managing unit, but is not displayed in the list of members displayed by the member managing unit;
wherein at least one of the first participant and the second participant is recommended to be registered as a friend of the user if the at least one of the first participant and the second participant is not registered as a friend at the time of the recommendation;
wherein the friend of the user is a member associated with the user in a messaging service,
wherein the first participant adds the second participant to the group in a case where the first participant has contact information of the second participant and the second participant accepts an invitation sent from the first participant, and
wherein the contact information includes a phone number or an email address registered in a phonebook of a mobile terminal of the first participant.

2. The system of claim 1, wherein: the member registering unit is configured to set whether to disclose contact information of the user to the group; and the member managing unit is configured to disclose the contact information of the user to at least one of the participants if the member registering unit is set to allow disclosure of the contact information.

3. The system of claim 1, wherein the member registering unit is configured to receive a piece of group information associated with the group, the piece of group information comprising at least one of a name, a picture, and an icon.

4. The system of claim 1, wherein the member managing unit is configured to assign, to the participants of the group, at least one of a permission to edit group information and a permission to withdraw from the group.

5. The system of claim 1, wherein: the member managing unit is configured to set whether to disclose contact information of one of the participants of the group; and the member managing unit is configured to disclose the contact information of the respective participant if the member registering unit is set to allow disclosure of the contact information.

6. The system of claim 1, wherein the member managing unit is configured to perform a unified search to find a participant or a member from the list of members and the list of groups.

7. The system of claim 1, wherein the member managing unit is configured to simultaneously display a list of recommended members and a list of recommended groups, the recommended members comprise members who requested the user to be a member, and the recommended groups comprise groups that requested the user to be a participant of the respective groups.

8. The system of claim 7, wherein the member registering unit is configured to add a group to the list of groups associated with the user.

9. The system of claim 1, wherein the member managing unit is configured to share with a third member, contact information of at least one of the participants.

10. The system of claim 9, wherein the member managing unit is configured to add the at least one of the participants to a list of members or a list of groups associated with the third member.

11. The system of claim 9, wherein the member managing unit is configured to provide contact information of one of the participants to the third member if the respective participant allows disclosure of the contact information.

12. The system of claim 11, wherein the contact information of the respective participant is stored in the messaging service system or in a mobile terminal of the third member.

13. A mobile terminal, comprising:
an interface configured to access a messaging service system that provides a messaging service; and
a display screen configured to display a service screen associated with the messaging service,
wherein the service screen is configured to receive registration of a group created by a user, the group comprising a first member designated by the user as a first participant of the group; the service screen is configured to display a list of registered members and a list of groups and assign, to the first participant of the group, a permission to add a second member as a second participant of the group,
wherein the second participant is displayed in the list of groups displayed by the service screen, but is not displayed in the list of registered members displayed by the service screen;
wherein at least one of the first participant and the second participant is recommended to be registered as a friend of the user if the at least one of the first participant and the second participant is not registered as a friend at the time of the recommendation;
wherein the friend of the user is a member associated with the user in a messaging service,
wherein the first participant adds the second participant to the group in a case where the first participant has contact information of the second participant and the second participant accepts an invitation sent from the first participant, and
wherein the contact information includes a phone number or an email address registered in a phonebook of a mobile terminal of the first participant.

14. The mobile terminal of claim 13, wherein the service screen is configured to set whether to disclose contact information of the user to the group, and the service screen is configured to disclose the contact information of the user to at least one of the participants if the service screen is set to allow disclosure of the contact information.

15. The mobile terminal of claim 13, wherein the service screen is configured to receive at least one piece of group information associated with the group, the piece of group information comprising at least one of a name, a picture, and an icon.

16. The mobile terminal of claim 13, wherein the service screen is configured to set whether to disclose contact information of one of the participants, and the service screen is configured to disclose the contact information of the respective participant if the service screen is set to allow disclosure of the contact information.

17. The mobile terminal of claim 13, wherein the service screen is configured to perform a unified search to identify a participant or a member from the list of registered members and groups.

18. The mobile terminal of claim 13, wherein the service screen is configured to display a list of recommended members and a list of recommended groups, the recommended members comprise members who requested the user to be a member, and the recommended groups comprise a list of groups that requested the user to be a participant of the respective groups.

19. The mobile terminal of claim 18, wherein the service screen is configured to add a group to the list of groups associated with the user.

20. The mobile terminal of claim 13, wherein the service screen is configured to share contact information of at least one of the participants with a third member.

21. The mobile terminal of claim 20, wherein the service screen is configured to set to display contact information of one of the participants to the third member if the service screen is configured to allow disclosure of the contact information.

22. A messaging service method using a terminal of a user that uses a processor, the method comprising:
creating a group in a messaging service by using the terminal of the user;
registering a first member using the terminal as a first participant of the group;
disclosing the group to the first participant;
assigning, to the first participant, a permission to add a second participant to the group,
wherein adding the second participant comprises adding a second member designated by the first participant as the second participant; and
displaying a list of registered members and a list of created groups using the terminal,
wherein the second participant is displayed in the list of created groups, but is not displayed in the list of registered members;
wherein at least one of the first participant and the second participant is recommended to be registered as a friend of the user if the at least one of the first participant and the second participant is not registered as a friend at the time of the recommendation;
wherein the friend of the user is a member associated with the user in a messaging service,
wherein the first participant adds the second participant to the group a case where the first participant has contact information of the second participant and the second participant accepts an invitation sent from the first participant, and
wherein the contact information includes a phone number or an email address registered in a phonebook of a mobile terminal of the first participant.

23. The method of claim 22, further comprising:
setting whether to disclose contact information of the user; and
disclosing the contact information of the user to one of the participants of the group if the contact information is set to be disclosed.

24. The method of claim 22, further comprising receiving a piece of group information associated with the group, the piece of group information comprising at least one of a name, a picture, and an icon.

25. The method of claim 22, wherein assigning permission to the first participant comprises assigning, to the first participant, at least one of a permission to edit group information and a permission to withdraw from the group.

26. The method of claim 22, further comprising: setting whether to disclose contact information of one of the participants; and disclosing the contact information of the respective participant if the contact information is set to be disclosed.

27. The method of claim 22, further comprising:
performing a unified search for a participant or a member from the list of members and the list of groups.

28. The method of claim 22, wherein displaying the list of members and the list of groups registered by the user comprises displaying a list of members who register the user and a list of groups created by the user.

29. The method of claim 28, further comprising adding a group to the list of groups associated with the user.

30. The method of claim 22, further comprising sharing contact information of at least one of the participants of the group with a third member.

31. The method of claim 30, wherein the at least one of the participants of the group is added to a list of members or a list of groups associated with the third member.

32. The method of claim 30, further comprising disclosing contact information of one of the participants to the third member if the contact information of the respective participant is allowed to be disclosed.

33. The method of claim 32, wherein the contact information of the respective participant is stored in the messaging service system or a terminal of the third member.

34. A non-transitory computer-readable recording medium storing a program to implement the method of claim 22.

35. The system of claim 1, wherein the member managing unit is configured to assign, to the first participant, the permission to add the second participant to the group on condition that contact information of the second participant is input by the first participant.

36. The mobile terminal of claim 13, wherein the service screen is configured to assign, to the first participant of the group, the permission to add the second member as the second participant of the group on condition that contact information of the second participant is input by the first participant.

37. The method of claim 22, wherein the assigning, to the first participant, the permission to add the second participant to the group is performed on condition that contact information of the second participant is input by the first participant.

38. The system of claim 1, wherein the member managing unit is configured to add the second participant to the group on condition that the second participant accepts an invitation from the first participant.

39. The system of claim 1, wherein the second participant includes a member that is automatically registered as a friend of the first participant by having contact information of the second participant included in a terminal of the first participant or vice-versa, a member recommended as a friend to the first participant, or a member that is registered by inputting contact information of the second participant to the terminal of the first participant.

40. The mobile terminal of claim 13, wherein the service screen is configured to add the second member as the second participant of the group on condition that the second participant accepts an invitation from the first participant.

41. The mobile terminal of claim 13, wherein the second participant includes a member that is automatically registered as a friend of the first participant by having contact information of the second participant included in a terminal of the first participant or vice-versa, a member recommended as a friend to the first participant, or a member that is registered by inputting contact information of the second participant to the terminal of the first participant.

42. The method of claim 22, wherein the assigning, to the first participant, the permission to add the second participant to the group is performed on condition that the second participant accepts an invitation from the first participant.

43. The method of claim 22, wherein the second participant includes a member that is automatically registered as a friend of the first participant by having contact information of the second participant included in a terminal of the first participant or vice-versa, a member recommended as a friend to the first participant, or a member that is registered by inputting contact information of the second participant to the terminal of the first participant.

* * * * *